United States Patent
MacCready, Jr.

(10) Patent No.: US 6,290,014 B1
(45) Date of Patent: Sep. 18, 2001

(54) POWER ASSIST FOR BICYCLES

(76) Inventor: Paul B. MacCready, Jr., 1065 Armada Dr., Pasadena, CA (US) 91101

( * ) Notice: Subject to any disclaimer, the term of this patent is extended or adjusted under 35 U.S.C. 154(b) by 0 days.

(21) Appl. No.: 09/692,823

(22) Filed: Oct. 10, 2000

Related U.S. Application Data

(63) Continuation of application No. 09/246,790, filed on Feb. 9, 1999, now abandoned.

(51) Int. Cl.[7] .................................................. B62K 11/00
(52) U.S. Cl. ............................. 180/205; 180/11; 180/15; 180/220
(58) Field of Search ........................... 180/11, 205, 220, 180/223, 210, 211, 227, 228, 15, 206, 207

(56) References Cited

U.S. PATENT DOCUMENTS

| | | | |
|---|---|---|---|
| 1,177,210 | * | 3/1916 | Pooley et al. ........................ 180/11 |
| 1,269,558 | * | 6/1918 | Neracher ............................. 180/11 |
| 1,373,918 | | 4/1921 | Smith . |
| 2,520,587 | * | 8/1950 | Wiesert .............................. 180/11 |
| 2,822,879 | | 2/1958 | Overton . |
| 3,312,299 | | 4/1967 | Kuecker . |
| 3,934,666 | | 1/1976 | Ellington . |
| 4,346,772 | * | 8/1982 | Clifft ................................ 280/204 |
| 5,113,959 | * | 5/1992 | Mastov et al. ....................... 180/11 |

FOREIGN PATENT DOCUMENTS

| | | | | |
|---|---|---|---|---|
| 5324 | * | of 1914 | (GB) | ................................. 180/11 |
| 15543 | * | of 1915 | (GB) | ................................. 180/11 |
| 379055 | * | 3/1940 | (IT) | ................................. 180/205 |

OTHER PUBLICATIONS

"Motor Wheeling", A. O. Smith Corp., Milwaukee, Wisconsin undated.

* cited by examiner

Primary Examiner—Daniel G. DePumpo
(74) Attorney, Agent, or Firm—William W. Haeflier

(57) ABSTRACT

A package operable to provide power assist to a pedal operated vehicle having a rear wheel, the vehicle movable longitudinally, comprises:

a) a carrier b) a ground engaging drive wheel supported by the carrier and at least one electric battery and an electric battery operated drive supported by the carrier to rotate the drive wheel, c) the carrier coupled to the vehicle for up and down pivoted movement about a generally lateral axis in close association with the vehicle rear wheel, d) the battery or batteries and at least part of the drive being located vertically above the drive wheel so that the weight of the carrier, the battery or batteries, and at least part of the drive bears downwardly on the drive wheel to urge the wheel into ground engagement.

20 Claims, 4 Drawing Sheets

POWER ASSIST FOR BICYCLES

This application is a continuation of Ser. No. 09/246,790 filed Feb. 9, 1999, abandoned.

BACKGROUND OF THE INVENTION

This invention relates generally to power assist devices for human powered vehicles, such as bicycles; more particularly it concerns a unique power assist package easily connectible to a bicycle and operable to provide power-assist, when needed or wanted.

There have been many design approaches for coupling a battery-powered power assist device to a bicycle, but so far to my knowledge none has provided, in a convenient, economical way, a complete system add-on device that one can install quickly onto bicycles having various types of tires, brakes, gears, etc. To avoid the complexity of needing to couple somehow to the bicycle drive system (tires, wheels, sprockets, chain, cranks; components with geometry that vary from bicycle to bicycle) the power assist needs to power its own wheel or wheels. Various sidecars towed units have been developed to provide self-contained, add-on drive of an integrated wheel or wheels, but none to my knowledge have been highly successful in the modern marketplace.

The geometry challenge is 1) to have the desired force pressing the wheel to the ground at all times, 2) the device never tangling with the rider's body, legs, or feet, 3) the device not inhibiting parking in a small space or backing up, 4) the device not preventing the rear bicycle rack from carrying packages, basket, or even a passenger, 5) the device not having a significant affect on the vehicle's dynamics, 6) the device combining all the batteries, motor, and drive wheel in a package that can be rolled or carried for recharging or storing; and the device avoiding scrubbing. For a practical battery-powered assist, the batteries, motor, and drive wheel should be part of a single unit.

SUMMARY OF THE INVENTION

It is a major object of the invention to provide an easily operable and reliable power assist package readily connectible to a bicycle or in combination with a bicycle, and overcoming problems and deficiencies as referred to above.

Basically, the package includes:
a) a carrier;
b) a ground engaging drive wheel supported by the carrier, and an electric battery operated drive supported by the carrier to rotate the drive wheel;
c) and connecting arm structure associated with the carrier and projecting for connection to the bicycle frame to position the carrier for up and down pivoted movement in close association with and generally parallel to the bicycle rear wheel, with the drive wheel lowermost extent spaced less than six inches to the rear of the lowermost extent of the bicycle rear wheel, so that neither the drive wheel or the carrier will interfere with operation of the bicycle.

It is another object to provide a package that is positioned "tightly" adjacent the left side of the rear bicycle wheel, with an arm connecting it to a pivot on the bicycle frame in front of the rear wheel axle. The drive wheel may typically contact the ground at a point between about 350 and 550 down from and rearwardly of the pivot, so that drive wheel thrust force is accompanied by a nearly equivalent down force that adds to the unit's weight to keep the drive wheel pressed to the ground and not slipping when powered. The body of the system moves around this pivot point to keep the drive wheel touching the ground, whether the bicycle is banked left or right, or if the road slants sideways.

A further object is to provide a device package having a portion that is movable up and down, but is constrained against any lateral or twisting movement relative to the bicycle. In a preferred embodiment, such constraint is provided by fingers or tabs that slide in slots, for example one at the upper part of the unit, and one at the lower portion of the unit.

Yet another object is to provide for contact of the drive wheel with the ground less than about 6 inches behind the ground contact point of the rear wheel. (If the drive wheel is further back, it tends to scrub as the bicycle turns sharply; and if the drive wheel has a large diameter it projects so far forward as to interfere with the rider's left heel during pedaling.) Solutions to these two problems of scrubbing (by limiting the drive wheel axis position to be not far behind the bicycle rear wheel axis), and rider heel hitting or striking (by limiting the front of the drive diameter wheel to be positioned only slightly in front of the main wheel axis) require use of a relatively small drive wheel. A large wheel can only be used if its axis is so far back that, to avoid scrubbing, it casters when the bicycle goes around a corner. While provision for castering solves the scrubbing problem, it introduces others, beyond just weight cost and complexity: a castering drive wheel that must operate over a wide speed range tends to wobble unless damped; the drive wheel jackknifes when the bike is pushed backwards; and the drive wheel must be moved further out laterally from the bicycle rear wheel to avoid striking it when the bike turns to the right. Such greater lateral distance means the drive wheel must move further up and down relative to the bike as the bicycle banks—complicating the pivoting limits and lateral constraints. Also, when the bike travels over and down a curb, the drive wheel is abruptly driven upward relative to the bike as the bike wheel descends.

A further object is to provide a drive package meeting the following requirements, for use with a standard size bicycle:
1) The unit's weight rests generally on the drive wheel;
2) The motion of the drive wheel/motor/battery assembly or package about the pivot at the front of a connecting arm is constrained laterally near the top and bottom of the unit carrier so that movement of the package is always in a plane parallel to the plane of the bike rear wheel;
3) The drive wheel contacts the ground less than 5 inches to the left of, and less than 6 inches (preferably less than about 4 ½ inches) behind the ground contact point of the main bicycle wheel, i.e. rear wheel; and
4) The front of the drive wheel is less than about 1 inch ahead of the bicycle rear axle.

These latter three requirements have associated related specific lengths or dimensions of the bicycle. These are lengths appropriate for an adult bicycle with the rear wheel being of standard dimension, about 26–27 inch diameter. The fore and aft geometric requirements relate more to the distance between the front and rear wheel axes of the bicycle (typically around 42 inches) than they do to the rear wheel diameter. For 16 or 20 inch diameter bicycle wheels, the avoidance of scrubbing of the drive and like wheels during turns and avoidance of heel hitting is comparable to the situation for a 26 inch wheel diameter bicycle, with the same bicycle wheel base. The power assist may alternatively be attached to other pedaled vehicles, such as tricycles, and the term "bicycle" is intended to refer to such.

An additional object is to provide, for a standard bicycle a combination wherein:

1) the drive wheel axis is less than about 10.5% of the bicycle wheel base behind the bike rear wheel axis; and
2) the drive wheel is spaced to the left of the bicycle rear wheel by an amount that leaves less than 19% of the bicycle rear wheel diameter spacing between the adjacent edges of the tires of the drive wheel and the bicycle rear wheel.

These features are applicable to a battery-powered electric assist unit that incorporates battery, motor, and wheel in one assembly. That assembly is preferably pivoted to 1) have a pivot position such that in normal operation the drive wheel ground contact point is between 35°–55° down from a horizontal line rearward from the pivot, and 2) permit vertical movement of the package in an upright plane parallel to the upright plane of the bike rear wheel, in the direction of travel. The assembly is also constrained from lateral or roll movements relative to the plane of the rear bicycle wheel. This constraint can be accomplished in various ways. One is the fingers/slots mechanism described above and herein. Another is to employ a bearing on or in application with the above described pivot, that rotates about an axis, parallel to the rear wheel axis and is sufficiently strong as to be able to constrain any motion of the main assembly from moving non-parallel to the plan e of the rear wheel.

A yet additional object is to provide features that include a handle affixed to the main assembly near the package top (front, rear, or side), the handle located on a spring-loaded arm, or gravity nested, so that it remain down snug against the assembly box or carrier, or frame, when not in use, but can be lifted up to a height convenient for trundling the unit. Another feature is providing the arm that extends from the main assembly, i.e. carrier, to the pivot to be hinged at the main assembly end, so it can be folded up along the front of the carrier box, whereby it is out of the way when moving or storing the device. Another arm can be provided that extends from the pivot to near the front of the drive wheel, and stabilizes the assembly, and also folds up when not in use. A rain cover top can be provided on the main assembly, the hinged cover keeping rain out, but permitting the flow of cooling air. Louvers on the side of the main assembly box can also permit air flow, but keep out rain.

A battery charger can be put into or behind the main assembly box or the cover. The batteries, can easily be lifted out by a strap and charged elsewhere, if desired. Free-wheeling of the drive wheel can also be provided to allow back-up of the unit (and drive wheel reverse rotation in free-wheeling mode). Various controls are usable, such as ON-OFF switches, or a cruise control to maintain bike speed, varying the output of the package to maintain a set speed, and in relation to power of pedaling. Other control objectives are possible such as speed indication.

These and other objects and advantages of the invention, as well as the details of an illustrative embodiment, will be more fully understood from the following specification and drawings, in which:

DRAWING DESCRIPTION

DETAILED DESCRIPTION

Figure 1:
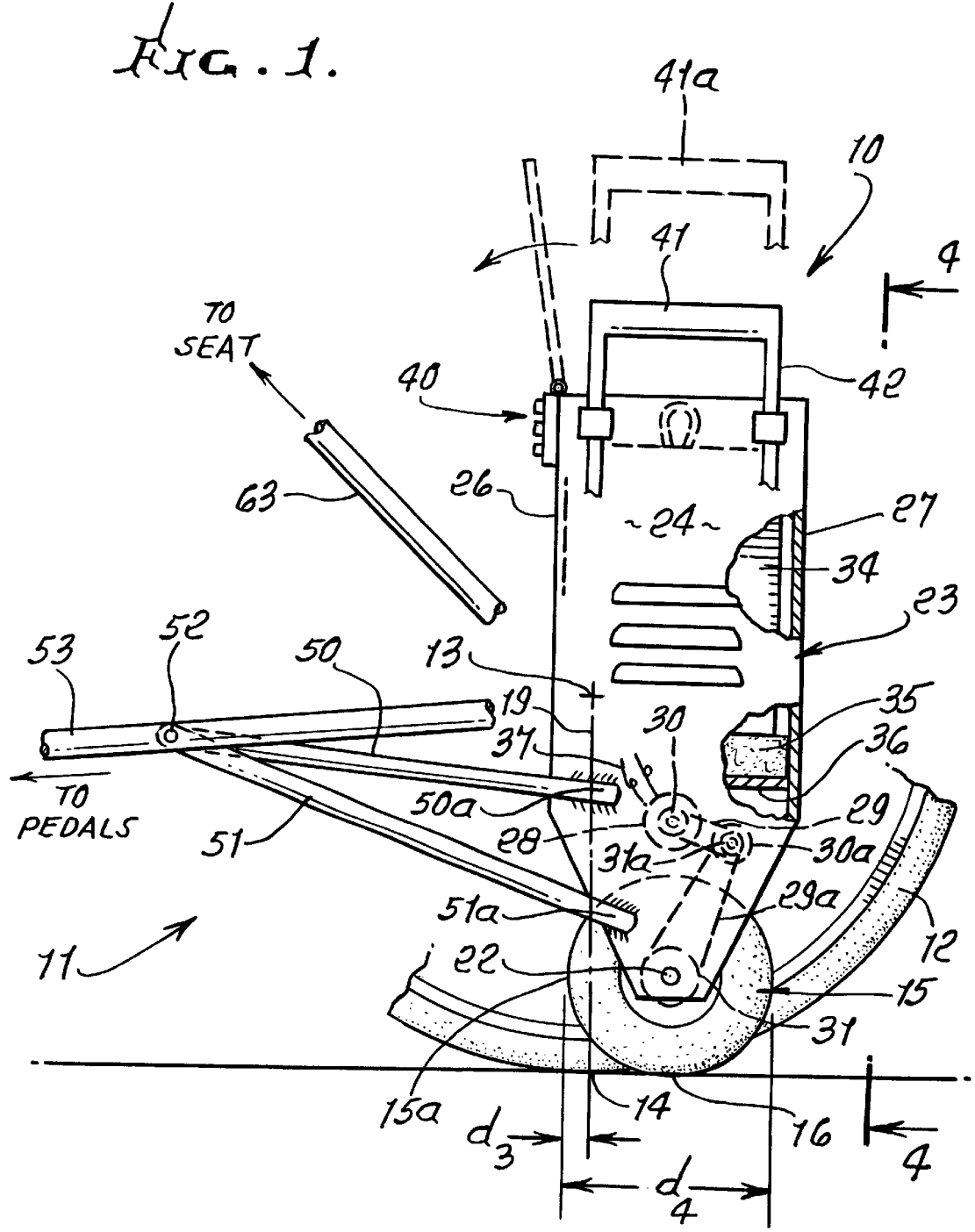
FIG. 1 is a side elevation showing a power assist unit pivotally connected to a bicycle, adjacent the left side of the bicycle rear wheel.
Figure 4:
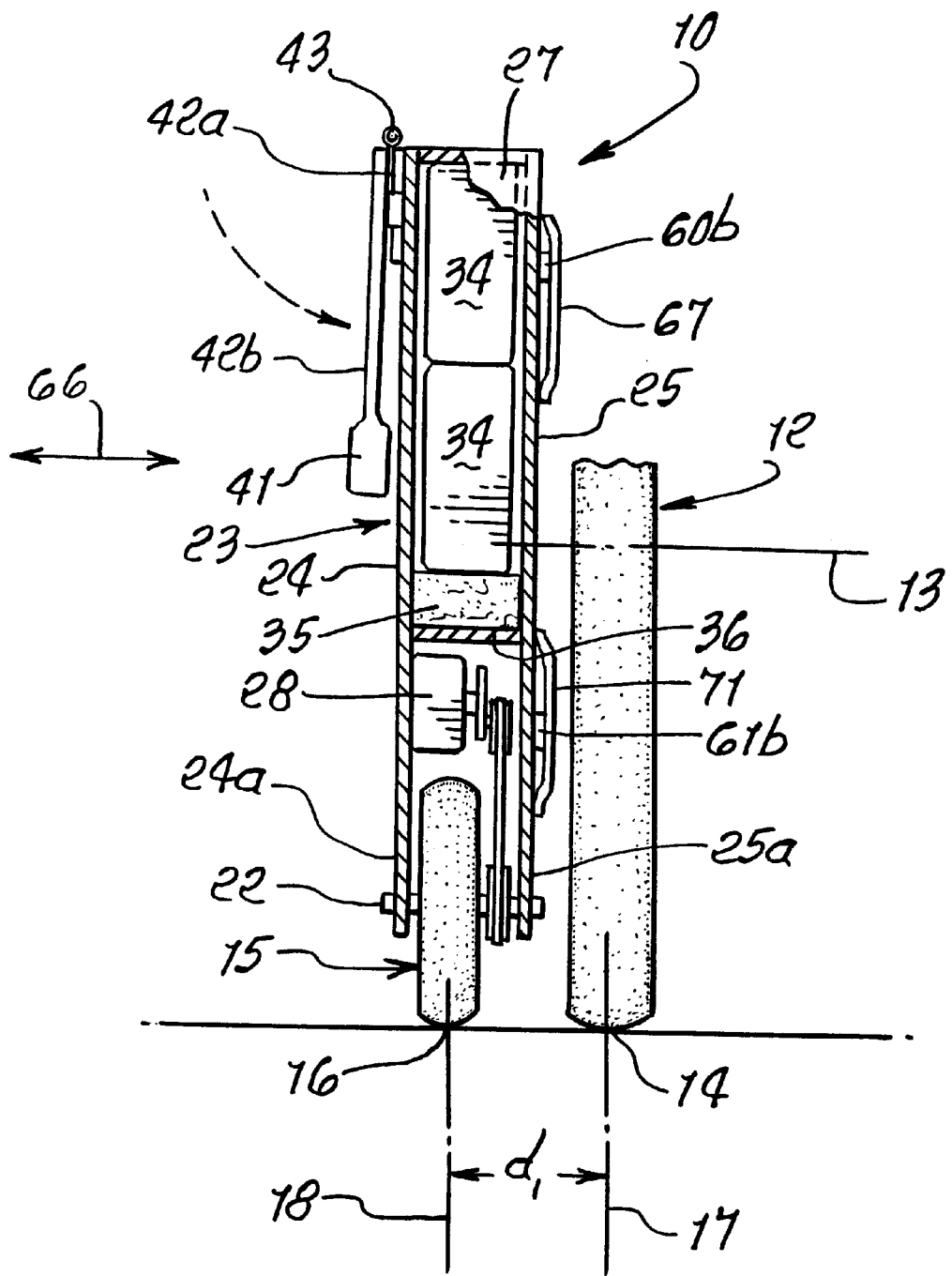
FIG. 4 is a rear elevation taken on lines 4—4 of FIG. 1, but showing interior details of the unit.

In FIGS. 1 and 4, a power assist unit or package 10 is located at the left side of a bicycle 11 having a rear wheel 12 defining a lateral axis 13 of rotation. Wheel contact with the ground is indicated at point 14. The power assist unit 10 has a drive wheel 15, much smaller than wheel 12, and which contacts the ground at point 16.

Figure 5:
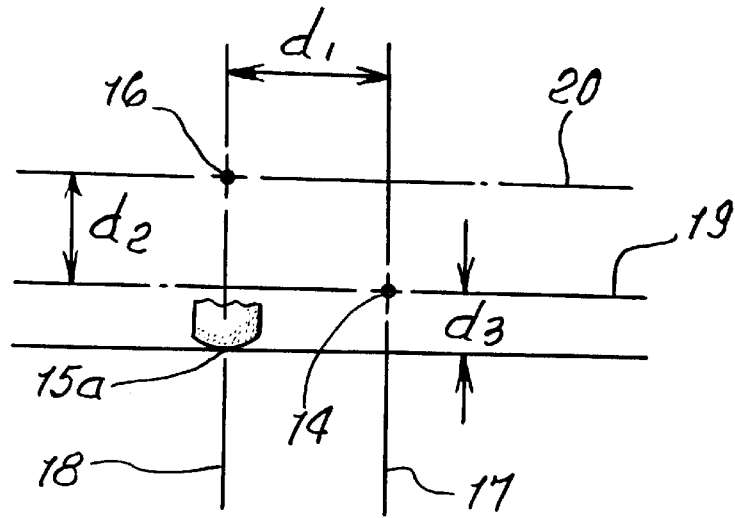
FIG. 5 is a schematic plan view showing location of wheel to ground contact points in longitudinal and lateral upright planes.

Points 14 and 16 are also seen in FIGS. 4 and 5, and located in longitudinally extending upright and forward planes 17 and 18 (bisecting the wheels) and in laterally extending upright planes 19 and 20. Point 14 is also at the ground level intersection of planes 17 and 19; and point 16 is also at the ground level intersection of planes 18 and 20. Plane 19 passes through and contains the bicycle's rear wheel axis 13. The spacing between parallel planes 17 and 18 is indicated at "$d_1$" and the spacing between parallel planes 19 and 20 is indicated at "$d_2$". The forwardmost edge 15a of drive wheel is located at a distance "$d_3$" forward of plane 19. As indicated above, for a bicycle rear wheel about 42 inches in diameter, the dimensions are as follows:

$d_1$ is preferably less than about 5 inches $d_2$ is less than 6 inches and preferably about 4 ½ inches $d_3$ is preferably less than about ½ inch (but in general is less than 2 inches)

$d_4$ (drive wheel diameter) is less than about 10 inches.

The drive wheel 15 has an axle 22 bearing mounted to the lower frame of an upright carrier 23. The carrier has opposite upright side walls 24 and 25 carried by the frame, and upright end walls 26 and 27, so that the wheel 15 is located between lower-most extents 24a and 25a of side walls 24 and 25, and protrudes forwardly and rearwardly, as well as downwardly, as seen in FIG. 1. An electric motor 28 is suitably mounted within the carrier interior, above the drive wheel, and drive chains 29 and 29a (or gearing) couple the motor to the wheel 15, as via suitable sprockets 30 and 31, and step-down sprockets 30a and 31a, whereby desired speed reduction is achieved, as between the RPM of the motor and the RPM of the drive wheel. A variable speed transmission can be used between the motor and drive wheel.

An electric battery, or batteries 34 are located within the carrier interior, for example above the motor, so as to be upwardly removable for replacement. A resiliently yieldable cushion, such as foam rubber 35, or a spring or springs, supports battery or batteries, above a support plate 36. Damping of the spring or springs may be employed. A suitable cable connection from the battery to the motor is indicated at 37; and accessible ON-OFF controls and/or speed controls are provided as at 40. A transporting handle for the package or unit 10 is seen at 41, protruding above the carrier. It has legs 42 extending downwardly into suitable channels at the side 24 of the carrier, and the handle can be elevated to an up-position 41a for use in manually transporting the unit 10 to and from a bicycle. Suitable stops on a leg 42 and on the carrier frame limit upward elevation of the handle. If desired, the extended handle leg sections 42a and 42b can be hinged, as at 43, to allow fold-down to position 42a seen in FIG. 4, as is desirable during power assist use.

Connecting arm structure is provided in association with the carrier and projecting for pivoted connection to the bicycle frame to position the carrier for up and down pivoted movement in close association with the bicycle rear wheel and generally parallel thereto, with the drive wheel lowermost extent spaced less than six inches to the rear of a lateral axis through the lowermost extent of the bicycle rear wheel, during non-banking travel of the bicycle.

Also, the connecting arm structure projects forwardly and upwardly from the carrier, the pivotal connection at 52 located forwardly of upright plane 19 containing the bicycle rear wheel axis.

As shown, the connecting arm structure includes two arms, 50 and 51 pivotally connected at 52 to the bicycle frame member 53 that extends between the bicycle rear wheel hub and the pedal hub. The connection 52 allows up-down pivoting of the arms 50 and 51, which are rigidly attached at 50*a* and 51*a* to the carrier 23, for example to the carrier frame. Locations 50*a* and 51*a* are spaced apart generally vertically, as shown. These locations may define locked hinge connections to allow unlocking and folding of the arms 50 and 51 back against the side of the carrier, for storage. Traction force generated by rotation of the drive wheel 15 is transmitted from the carrier to the arms 50 and 51, and forwardly and upwardly by those arms to the bicycle frame. Pivot location 52 is located forwardly of the upright plane 19 containing the bicycle rear wheel axis 13.

The connecting arm structure also constrains the carrier for pivoted movement parallel to upright plane 17 defined by the bicycle rear wheel, and normal to axis 13, and at a maintained gap or spacing such as referred to at $d_1$ in FIGS. 4 and 5. For that purpose two additional arms 60 and 61 are preferably employed, to extend between the bicycle frame and the carrier for maintaining carrier up-down movement in a pre-determined vertical plane, such as plane 18 as referred to. Arm 60 has one end rigidly connected or clamped at 60*a* to bicycle lower frame member 53 (see FIG. 2); and arm 61 has one end rightly connected or clamped at 61*a* to bicycle upper frame member 63 that extends toward the bicycle seat. The two arms may also have their mid-portions rigidly interconnected as shown at 64.

Figure 3:
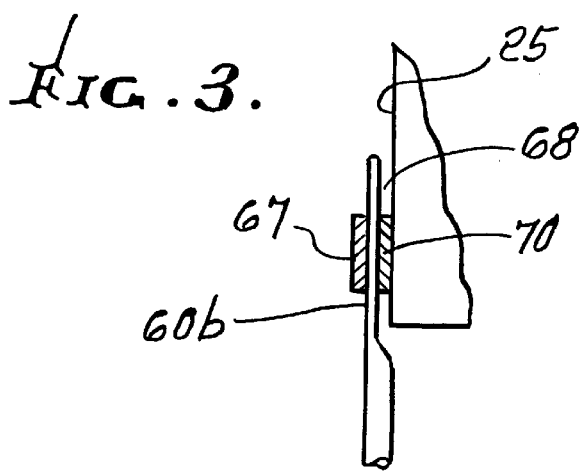
FIG. 3 is an enlarged section taken on lines 3—3 of FIG. 2.

The opposite ends 60*b* and 61*b* of the arms extend into close proximity to the carrier 23, as for example adjacent its side 25, to guide its vertical movement and to block lateral movement of the carrier in the direction of arrows 66 in FIG. 4. For this purpose, lost motion tongue and groove connections may advantageously be provided between the arm ends 60*b* and 61*b* and the carrier side wall 25. Elongated rigid strap 67 has its opposite ends connected at 67*a* and 67*b* to flat vertical side 25 of the carrier, and to provide an elongated guide slot or groove 68 between 67 and 25. The slot closely receives the flat arm end 60*b* (finger) and allows up-down movement of the carrier and strap about pivot 52, relative to arm end 60*b*, as indicated by arrow 69. A thin slider or wear plate 70 may be attached to 25 to slide against the arm end. Accordingly, arm end 60*b* guides vertical movement of the carrier, and blocks its lateral deviation. See FIG. 3.

Similarly, a lower level elongated rigid strap 71 has its opposite ends connected at 71*a* and 71*b* to side 25 of the carrier, to provide a similar elongated guide slot or groove between 71 and 25. That slot closely receives the flat arm end 61*b*, and allows up-down movement of the carrier and strap, about the pivot 52, and relative to arm end 61*b*, as indicated by arrow 75. A thin slider or wear plate, like plate 70 may be attached to 25 to slide against the flat arm end 61*b*. Accordingly, arm end 61*b* likewise guides vertical movement of the carrier and blocks its lateral deviation.

Figure 2:
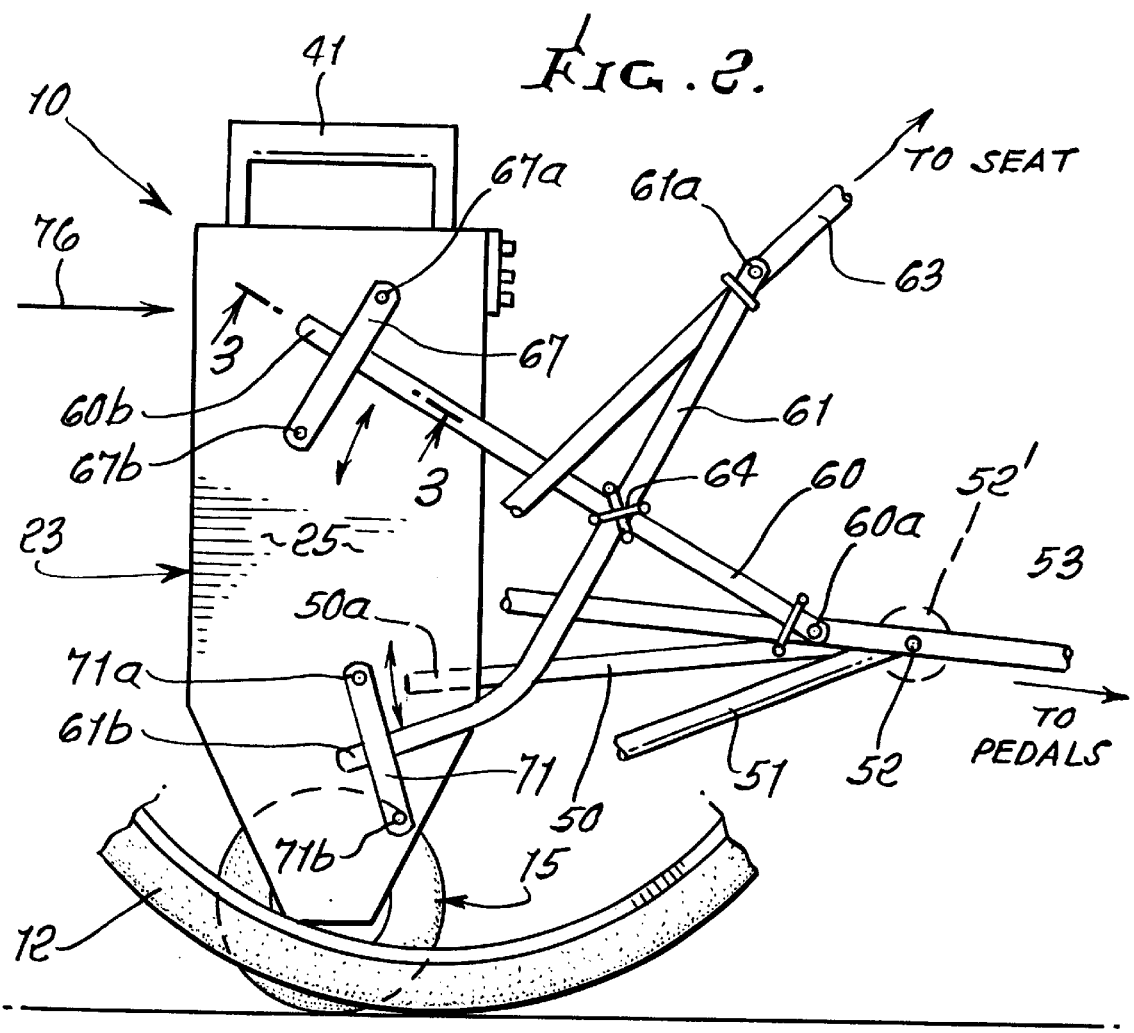
FIG. 2 is an opposite side elevation view of the power assist unit.

Another function of the pre-positioned arm ends 60*b* and 61*b* is to allow their simple and rapid assembly into the slots under the straps 67 and 71, when the power assist unit is initially assembled to the stationary bicycle, as in a forward direction indicated by arrow 76, in FIG. 2. It is only then necessary to assemble the pivot connection 52 as by means of a simple pin attachment. A parallelogram or other multi-bar linkage may be used to pivotally connect the carrier to the frame.

The position of the power assist unit as described, relative to the bicycle, maintains it out of interference with the cyclist's feet or shoes as during peddling of the bicycle; and the power assist unit is also maintained out of contact with the bicycle rear wheel. At the same time, the closeness of the power assist unit to the bicycle rear wheel prevents impact with nearby objects to the lateral side of the bicycle. Parallel up-down movement of the unit is also maintained during lateral tilting of the bicycle frame, in use. An enlarged bearing (indicated at 52') at pivot location 52 may alternatively, or additionally be used to block lateral direction of the power assist unit.

FIG. 4 also shows optional fold-down of the handle 41, as via a hinge 43 located between sections 42*a* and 42*b* of the handle legs 42, for handle storage during power assist use.

The axle of the drive wheel or motor can have an end extension for power take-off to devices such as tools, whereby the power assist device has extended utility.

The drive wheel typically includes an elastomeric tire, having a maximum width of about two inches, for good traction.

Figure 6:
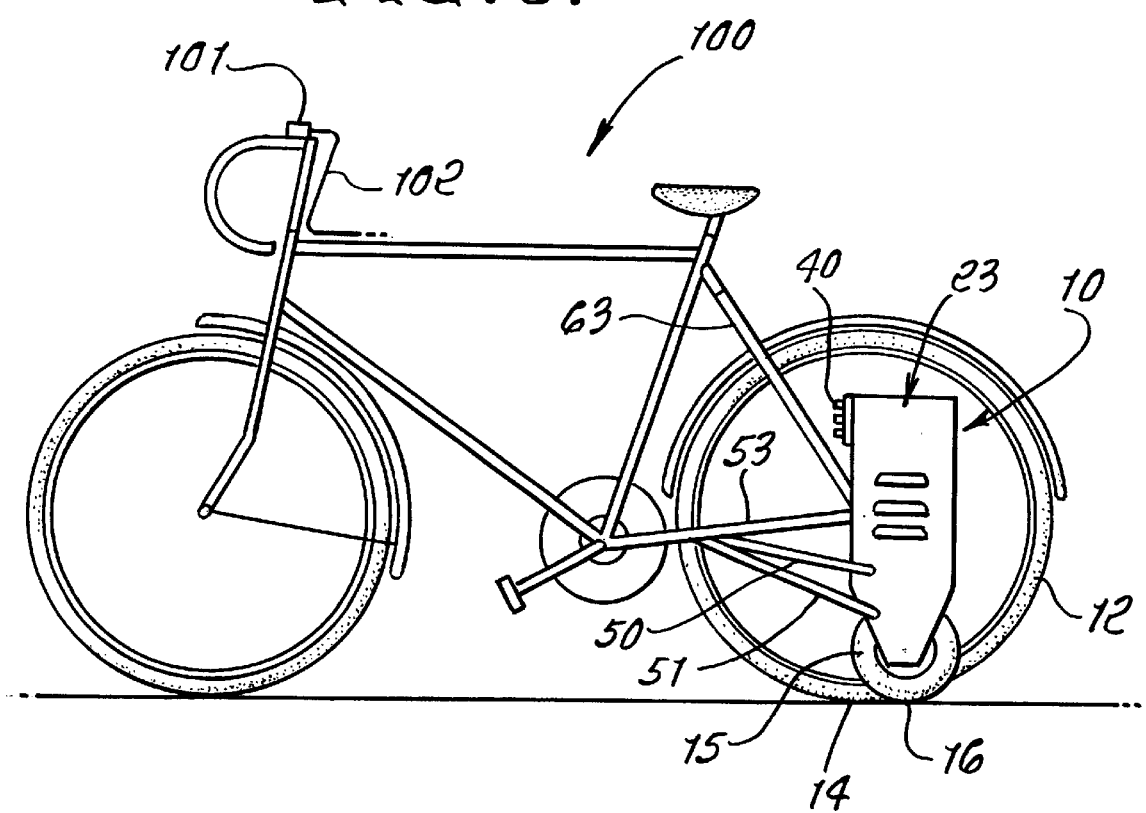
FIG. 6 is a left side view of a bicycle to which the power assist unit is connected.

FIG. 6 shows a two-wheeled bicycle 100 having the package 10 connected in driving relation. Also shown are controls 101 at the bicycle handle bars that have wire connection 102 to the controls 67, or to the motor or transmission, for controlling operation of the power assist unit.

The motor may consist of an internal combustion engine power unit, instead of an electric motor; or, the drive can employ a fuel cell, or other power source.

Finally, the drive wheel axis can be tilted relative to the carrier, so that the wheel axis is canted from horizontal. The carrier itself can be positioned just to the rear of the bicycle rear wheel axis so as not to interfere with fasteners or other structure projecting at that axis.

I claim:

1. A package operable to provide power assist to a two-wheel bicycle having pedals and a frame and longitudinally spaced front and rear wheels with associated front and rear axes of rotation, the package being in combination with said bicycle comprising a) a carrier, b) a ground engaging drive wheel supported by the carrier, the drive wheel having lowermost extent, and an electric battery operated drive to rotate the drive wheel, c) the bicycle having a frame and a rear wheel with lowermost extent, and connecting arm structure associated with the carrier and projecting forwardly and providing pivoted connection to the bicycle frame to position and laterally guide the carrier for free up and down pivoted movement in close association with the bicycle rear wheel and generally parallel thereto at predetermined spacing, with the drive wheel lowermost extent spaced less than about six inches to the rear of a lateral axis through the lowermost extent of the bicycle rear wheel during non-banking travel of the bicycle, said pivoted connection located forwardly of an upright plane containing the bicycle rear wheel axis, d) the bicycle having a pedal cyclic path of travel, and the drive wheel and carrier having forwardmost portions located rearwardly of said cyclic path of travel of the bicycle pedal during pedaling of the bicycle so that neither the drive wheel nor the carrier will interfere with said pedal cyclic path of travel, e) and wherein the bicycle has a frame and said connecting arm structure includes upper and lower arms extending forward to a common pivotal connection to the bicycle frame forward of the carrier, the upper and lower arms connected to the carrier at spaced upper and lower locations, respectively, whereby the carrier is constrained for up-down pivotal movement while located directly adjacent the bicycle rear wheel.

2. The combination of claim 1 wherein the drive wheel lowermost extent is spaced less than about six inches to the rear of a lateral axis through the lowermost extent of the bicycle rear wheel during non-banking travel of the bicycle, said pivoted connection located forwardly of an upright plane containing the bicycle rear wheel axis, the drive wheel, drive and carrier having forwardmost portions that are located rearwardly of a locus that is about 2 inches forwardly of said upright plane containing the bicycle rear wheel axis, whereby none of the drive wheel, drive, and carrier will interfere with the cyclist during pedaling, the drive wheel having a diameter less than about 10 inches.

3. The combination of claim 1 wherein said drive wheel forwardmost portion is less than about ½ inch forward of an upright lateral plane containing the bicycle rear wheel axis.

4. The combination of claim 1 wherein the bicycle rear wheel defines a first plane normal to the rear wheel axis and bisecting the bicycle rear wheel, and the drive wheel defines a second plane normal to the drive wheel axis and bisecting the drive wheel, and wherein the first and second planes have about 5 inches separation.

5. The combination of claim 1 wherein said carrier extends vertically above the drive wheel, and there being a battery receiving space above the level of the drive wheel.

6. The combination of claim 5 including a flexible support located within the carrier to support the battery therein.

7. The combination of claim 5 wherein the drive includes an electric motor operatively connected to the drive wheel, and located below said battery receiving space.

8. The combination of claim 1 wherein said bicycle rear wheel defines an upright plane normal to the bicycle rear wheel axis, said connecting arm structure constraining the carrier for pivoted movement parallel to said plane.

9. The combination of claim 5 including a handle connected to the carrier for up-down adjustable movement, above the carrier.

10. The combination of claim 1 wherein said drive wheel includes an elastomeric tire having a maximum width of about two inches.

11. The combination of claim 5 wherein said drive includes an electric motor and speed-reducing elements coupling the motor to said drive wheel.

12. The combination of claim 11 wherein said elements define a variable drive ratio transmission, between the motor and drive wheel.

13. The combination of claim 1 wherein said connecting arm structure includes at least one arm rigidly connected to the bicycle frame and having at least one generally rearwardly projecting end, and slot structure carried by the carrier and closely receiving said at least one projecting end to block lateral movement of the carrier, said slot structure being elongated to allow up-down movement of the carrier relative to said at least one arm end.

14. The combination of claim 13 wherein there are two of said arm ends, spaced apart generally vertically and extending adjacent at least one side of the carrier.

15. The combination of claim 1 wherein said pivotal connection is sufficiently large to block lateral movement of the carrier relative to the bicycle rear wheel.

16. The combination of claim 1 wherein there is a power unit that incorporates said electric battery, and the power unit is located vertically above the level of the drive wheel so that the weight of the carrier and at least part of said power unit bears downwardly on the drive wheel to urge the wheel into ground engagement.

17. The combination of claim 16 wherein the drive wheel has lowermost extent spaced less than six inches to the rear of a lateral axis through the lowermost extent of the vehicle rear wheel.

18. The combination of claim 16 wherein the power unit consists of one of the following:
   i) electric battery and battery operated drive
   ii) internal combustion engine
   iii) fuel cell.

19. The combination of claim 1 including at least one guide arm operatively coupled between the frame and carrier to restrain lateral movement of the carrier relative to said bicycle rear wheel, said guide arm and carrier coupled for relative movement, substantially vertically.

20. The combination of claim 19 wherein said guide arm has orientation relative to the frame to accommodate initial relative forward assembly of the package to the frame.

* * * * *